United States Patent [19]

Nelson

[11] 4,170,164
[45] Oct. 9, 1979

[54] PROFILE CUTTER

[75] Inventor: Arvid L. Nelson, Quincy, Ill.

[73] Assignee: Cooper Industries, Inc., Houston, Tex.

[21] Appl. No.: 901,556

[22] Filed: May 1, 1978

Related U.S. Application Data

[62] Division of Ser. No. 781,614, Mar. 28, 1977, Pat. No. 4,102,583.

[51] Int. Cl.² ........................... B27F 1/00; B26D 1/12
[52] U.S. Cl. ......................................... 409/13; 407/25
[58] Field of Search .................... 407/23, 25, 26; 90/3, 90/4

[56] References Cited

U.S. PATENT DOCUMENTS

| | | | |
|---|---|---|---|
| 1,707,105 | 3/1929 | Wheatley | 407/26 |
| 1,759,333 | 5/1930 | Wildhaber | 407/26 |
| 2,310,826 | 2/1943 | Adams | 407/25 |
| 3,059,546 | 10/1962 | Johnson et al. | 407/23 |
| 3,662,650 | 5/1972 | Maker | 90/3 |
| 3,863,317 | 2/1975 | Taniguchi et al. | 407/26 |
| 4,102,583 | 7/1978 | Nelson | 407/25 |

*Primary Examiner*—Harrison L. Hinson
*Attorney, Agent, or Firm*—Michael E. Martin

[57] ABSTRACT

A rotary cutting tool for forming fluted rotors and the like comprising a cylindrical body having a plurality of metallic carbide cutting blades which are detachably mounted on the circumference of the body. The blades are arranged along a helical line with respect to the axis of rotation of the cutter body. The blades may be circumferentially spaced apart equidistant, one blade from each adjacent blade, to form only one turn of the helix and whereby each blade may be easily ground to a precise cutting edge contour while mounted on the cutter body. The cutting edge contour of each blade may be such that each blade cuts portions along the entire profile of the form produced on the workpiece.

4 Claims, 9 Drawing Figures

PROFILE CUTTER

This is a division of application Ser. No. 781,614, filed Mar. 28, 1977 now U.S. Pat. No. 4,102,583.

BACKGROUND OF THE INVENTION

In the art of machining gears and fluted rotors for pumps, compressors and the like it is important that the shape or profile of the gear teeth or rotor lobes be formed with great accuracy. Such accuracy of the profile shape is important for proper interaction or meshing of the teeth or lobes and for achieving suitable operating efficiency for fluid handling devices such as fluted rotor pumps and compressors. The machining of tooth or flute profiles by precision form milling has been a known and accepted method for the manufacture of fluted rotors for helical screw compressors and pumps as well as gears, splines, sprockets and other toothed machine elements. In conventional form milling operations one flute or tooth space is cut completely and the workpiece is then rotatably indexed with respect to the cutter to the next flute position and the cutting operation repeated. In form milling of helical screw compressor rotors, for example, the milling cutter is mounted for rotation about an axis which is substantially perpendicular to the helix line of the rotor flutes. The workpiece or rotor is advanced with respect to the cutter in a direction parallel to the rotor longitudinal axis and is rotated in timed relation to the axial feed to form the helical flute. When one flute is completely formed the workpiece is returned to the starting point of the operation and rotatably indexed to a position for cutting another flute. In the manufacture of helical screw rotors the form milling process provides suitable profile accuracy and can be used for unsymmetrical as well as symmetrical rotor profiles. Form milling processes are, however, relatively slow and the periodic indexing of the workpiece from one flute to the next introduces a greater chance for error in flute or tooth spacing.

The process known as hobbing may be used for symmetrical and unsymmetrical flute or tooth profiles but must be associated with workpieces which have uniform spacing of the flutes or teeth. Hobbing, which is widely used for cutting gears, may obtain acceptable profile accuracy at relatively high rates of production when compared to form milling. Moreover, since the workpiece is continually indexed during one pass of the cutter, accurate spacing of the flutes or teeth is more easily obtained and the workpiece is finished in one continuous operation.

However, with integrally formed hobs wear and the ever present danger of damaging a cutting blade causes great expense in tooling reconditioning and replacement, particularly for hobs used to accurately cut relatively large gears and rotors for helical screw machines.

It has been suggested that hobs may be made with replaceable cutting blade elements. Such arrangements are discussed in U.S. Pat. No. 2,498,721 to S. M. Stafford and U.S. Pat. No. 3,740,808 to K. Shioya. The hobs disclosed in the aforementioned patents require that the cutting blades be ground to their finished form before being inserted in place on the cutter body. Grinding the blade elements to the desired profile form or sharpening the edges while the blade elements are in place on the body is extremely difficult due to the plural rows of blades wherein axially adjacent blades interfere with grinding a particular cutting edge on a blade element. Furthermore, the problem of precisely locating the finish ground blade elements on the cutter body very often results in less than acceptable profile accuracy and uneven wear on the blade elements. Heretofore, the benefits derived from high production rates using the hobbing process have been substantially negated by the high initial cost of hobbing cutters as well as the costs associated with maintenance and replacement of the cutters. This has been found to be particularly true when considering the hobbing process for the manufacture of rotors for helical screw fluid handling machines, namely pumps, compressors, and expanders. The condition applies just as well, in varying degrees, to the manufacture of gears, splined shafts, chain sprockets, and various other machine elements.

SUMMARY OF THE INVENTION

The present invention provides an improved cutter for forming tooth profiles or flutes on machine elements including gears, rotors for helical screw machines, sprockets, and other machine elements. In a preferred embodiment of the present invention there is provided a rotary cutter for machining fluted rotors for helical screw type pumps, compressors, and the like. The profile cutter of the present invention is preferably used in conjunction with a universal high-speed hobbing machine whereby improved production of accurately cut fluted rotors may be obtained without incurring prohibitive tooling costs.

In accordance with the present invention there is provided a rotary profile cutter having a plurality of replaceable cutter blades mounted on a cutter body and spaced apart circumferentially and along a predetermined helix with respect to the axis of rotation of the cutter body. The profile cutter of the present invention has only one helical turn, that is to say the blades are spaced such that there is only one helical row of blades whereby there are no blades which are axially in line with any other blades on the cutter. Accordingly, each blade may be mounted in its respective position on the cutter body and then shaped to its final cutting profile without interference with an adjacent blade or blades. Moreover, individual blade elements may be resharpened, or replaced as need be without considering the problems of avoiding interference with any other blade on the cutter. Furthermore, each blade may have a desired relief angle ground thereon over its entire cutting edge, the relief angle varying from blade to blade if deemed necessary.

The present invention further contemplates a rotary profile cutter which may be used in a process whereby the workpiece is continuously rotated or indexed in such a way that a plurality of equally spaced flutes and lobes are formed in their entirety in one pass of the cutter with respect to the longitudinal axis of the workpiece. In accordance with the present invention the flute and lobes of rotors for helical screw type fluid handling machines may be formed in one operation and in a more rapid, accurate, and less costly process than was heretofore known.

The profile cutter of the present invention may be provided with all blades sharpened to a common cutting edge or contour which is not the profile formed on the workpiece, but which will generate the desired profile on the workpiece. Moreover, the profile cutter of the present invention may also be provided with cutter blades which are each formed to have a different cutting edge contour whereby each blade will cut the entire profile of the workpiece. Such an arrangement provides more uniform wear on the cutter blades and produces more accurate profiles on the workpiece. Machining time for a given workpiece may also be reduced because the cutting forces are distributed more evenly among all cutter blades.

In addition to the superior productivity of the profile cutter of the present invention, benefits are also realized from the extended life of the cutter blades and the ease and accuracy of forming the cutting edge contour on each cutter blade. Using suitable known grinding equipment, the entire peripheral cutting edge of each cutter blade may be ground by a rotary grinding tool to form the cutting edge contour, each bladed contour being different from the other if desired, and a suitable cutting relief angle may be formed on each blade element. Moreover, by being able to grind the periphery of each cutting blade element, individual blades may be repositioned on the cutter body when worn or broken to provide adequate grinding stock to form the cutting edge contour.

The present invention still further provides a rotary multibladed cutter for forming grooves or flutes on an article wherein the cutting edge contours of the respective cutter blades are formed such that, in respective angular positions of the blades as they pass through the envelope of the article, portions of the flute profile are formed by each blade which portions collectively define the complete flute profile.

The present invention also contemplates an improved method of forming a workpiece to have a plurality of equally spaced peripheral grooves or flutes which are formed by a rotary cutter having a plurality of blades spaced apart along a helical line on the cutter to form only one turn or less of the helix. The cutter and workpiece are rotated in timed relationship such that all grooves or flutes are formed in one pass of the cutter along the axis of rotation of the workpiece.

The abovementioned superior features and advantages of the present invention may be more fully appreciated from the detailed description of a preferred embodiment.

DESCRIPTION OF THE PREFERRED EMBODIMENTS

Figure 1:
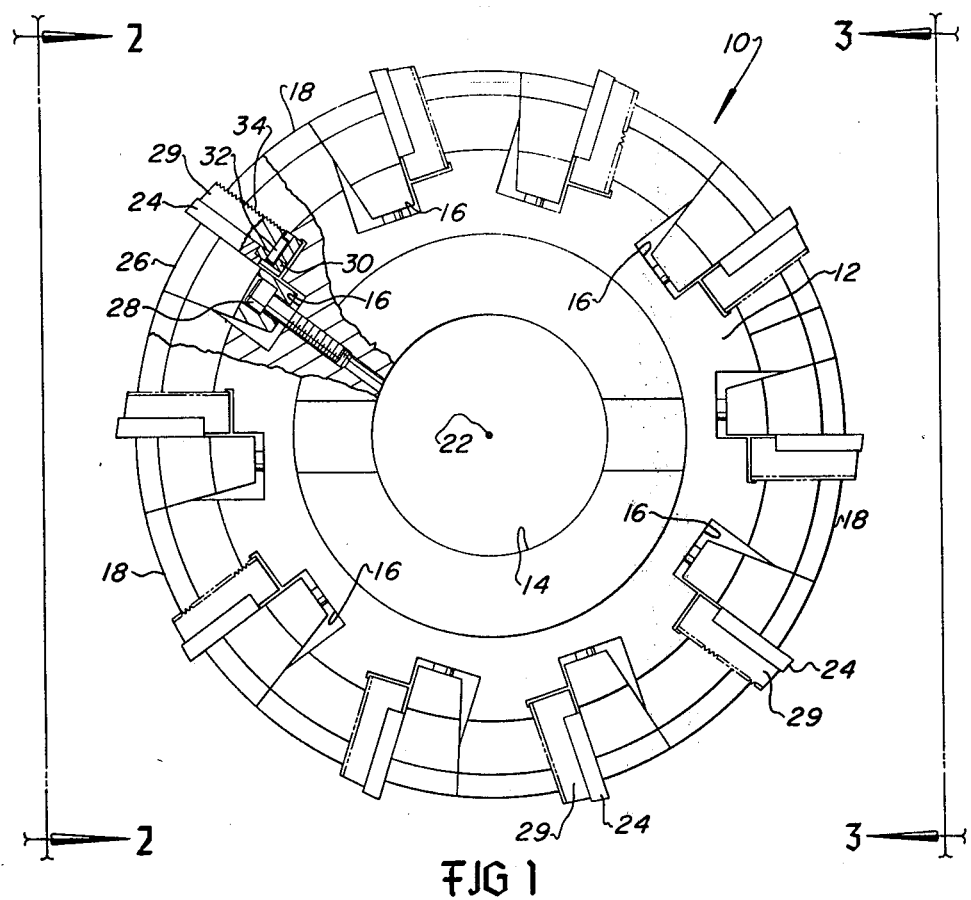
FIG. 1 is an end view, partially sectioned, of a rotary profile cutter in accordance with the present invention.
Figure 2:
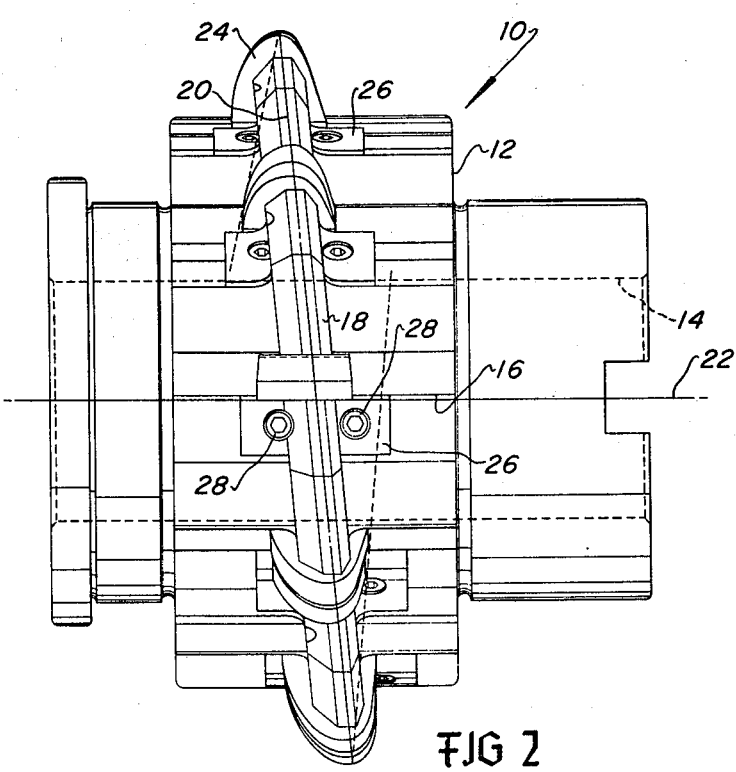
FIG. 2 is a view taken from the line 2—2 of FIG. 1.
Figure 3:
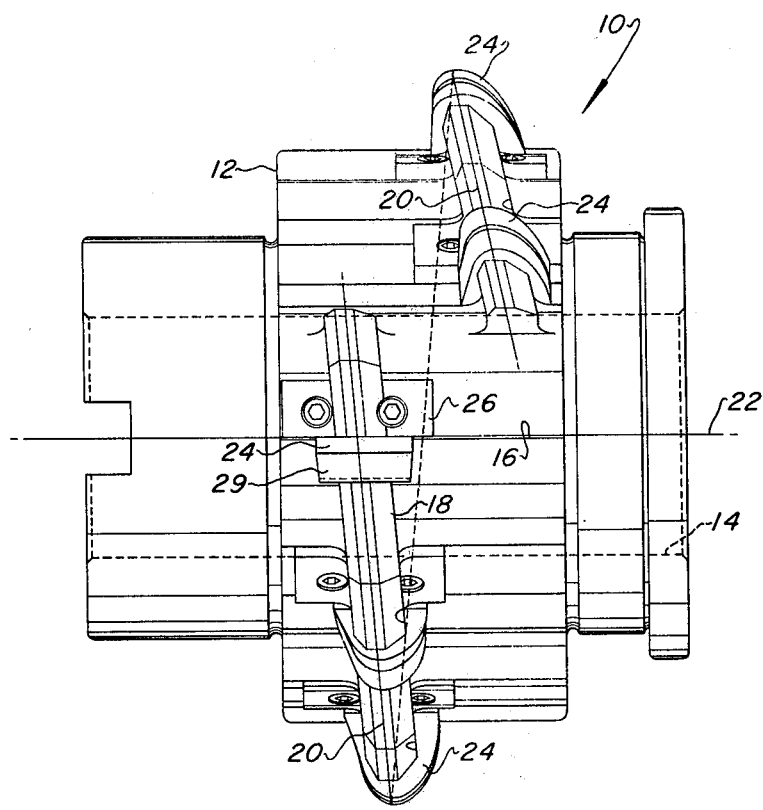
FIG. 3 is a view taken from the line 3—3 of FIG. 1.

Referring to the drawings and in particular to FIGS. 1 through 3 a preferred embodiment of the present invention is characterized by a rotary cutter generally designated by the numeral 10. The cutter 10 includes a generally cylindrical body 12 having a central longitudinal bore 14 for suitably mounting the cutter on a rotatable arbor or the like. The body 12 has a plurality of axially extending stepped recesses 16 which open to the periphery of the cutter body and are equally spaced around the circumference thereof. The body 12 also includes radially extending flange portions 18 between the recesses 16. The flange portions 18 are disposed on a helical line 20 with respect to the longitudinal central axis 22 of the cutter body 12 and form substantially one complete turn of the helix as shown in FIG. 3.

The cutter 10 also includes a plurality of cutting blades 27 which are suitably mounted in the stepped recesses 16 and are retained on the cutter body by removable wedge shaped retaining blocks 26. The blade retaining blocks 26 are secured to the cutter body by threaded fasteners 28. The blades 24 may be formed of a suitable cemented carbide material normally used for metal cutting tools.

Each blade 24 is mounted on a support member 29 and located with respect to the support member by a key 30. The keys 30 are secured to the support members by pins 32 as shown by way of example in FIG. 1. The support members 29 are each provided with serrations 34 on the face of the support member opposite the blade, which serrations interfit with cooperable serrations on the cutter body 12 to aid in retaining the blade and support member in a fixed radial position with respect to the cutter body. When the blades 24 are mounted as shown in the drawings the wedging action of the blocks 26 retains the blades on the cutter body. However, the blades 24 may be further secured to the support members by a suitable adhesive or by soldering, if desired. The support members 29 and the cutter body 12 may be made of carbon steel.

As may be appreciated from the foregoing description taken in conjunction with the drawings, the blades 24 and their support members 29 may be repositioned radially with respect to the axis 22 of the cutter body when one or more of the blades are worn and need to be resharpened and have the cutting edge contour reestablished. The individual blade and support members may also be moved laterally or in a direction parallel to the axis 22 in a limited way for purposes of positioning the blades accurately along the helix reference line 20, FIGS. 2 and 3. The cutter 10 shown by way of illustration in the drawings is provided with ten equally spaced blades 24 which are positioned along the helical reference line 20 but do not overlap or become axially aligned with any other blades. Accordingly, the blades themselves form only one turn of the helix in the sense that there is only one row of blades and no more than one blade is in the same radial position with respect to the axis 22. Various numbers of blades may be used and the circumferential spacing of the blades need not be equal for all blades, although such is preferred for better distribution of forces on the cutter and workpiece.

Figure 4:
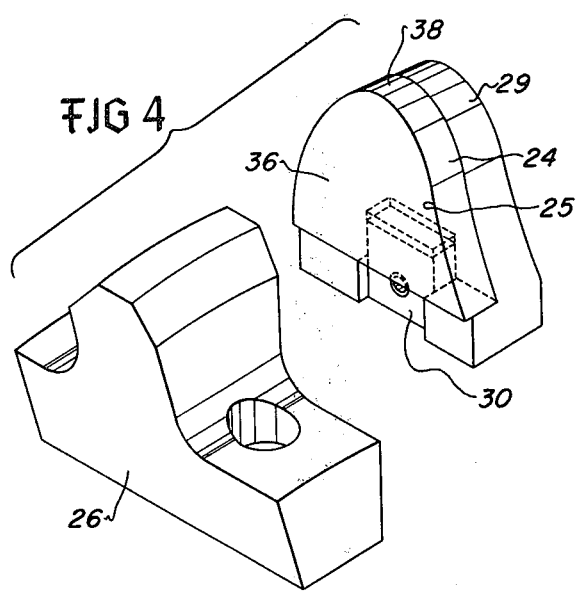
FIG. 4 is a perspective view of a cutting blade and support member, and a blade retaining block.

An important advantage of the cutter 10 is that the entire cutting edge 25 of each blade 24 may be formed after the blade is positioned on the cutter body and secured thereto. By the use of suitable cutting tool grinding equipment each blade 24 may be formed to have a cutting edge contour which is the same as the other blades or each blade may be formed to have a cutting edge contour different from the contour of the other blades. Referring to FIG. 4, each blade 24 has a cutting edge 25 which is formed by the intersection of the planar face 36 of the blade and the surface 38. The surface 38 may be ground by suitable equipment to provide relief for the cutting edge 25 as part of the operation which forms the edge itself to the desired contour. The surface 38 may be formed to be slightly concave if a circular cutter grinding wheel is used. Moreover, the blades 24 may also be advantageously formed to have their cutting edges lie in planes which are parallel to the axis 22 or pass through the axis as well. The arrangement simplifies the process of forming the cutting edge on each blade. One suitable type of cutter profile grinding apparatus which may be used in practicing the present invention is known as a numerically controlled contour surface grinding machine equipped with a three-axis simultaneous numerical controller. One source of such a machine is CompuGrinder, Indianapolis, Indiana. Numerical data for determining cutter blade contour may be supplied for use with the apparatus described above. Such data may be determined in accordance with a procedure described generally herein. Furthermore, a procedure may be used for mounting and handling the cutter 10 similar to that which is described in U.S. Pat. No. 3,579,315 which is assigned to the assignee of the present invention.

As may be appreciated from the foregoing description, cutter blades 24 may be resharpened or replaced individually, as needed, without great expense while at the same time preserving and maintaining a high degree of accuracy of the process of cutting a workpiece to form a prescribed tooth or flute profile.

The profile cutter 10 according to the present invention is particularly adapted for cutting the flutes or grooves in helical screw type pumps, compressors, and expanders. The cutter 10 may, for example, be used to cut helical screw rotors having flutes or grooves with profiles similar to those disclosed in U.S. Pat. No. 3,787,154 which is assigned to the assignee of the present invention. Other types of profiles for machine elements such as gears, sprockets, splined members and the like may be formed by a cutter in accordance with the present invention.

Figure 6:
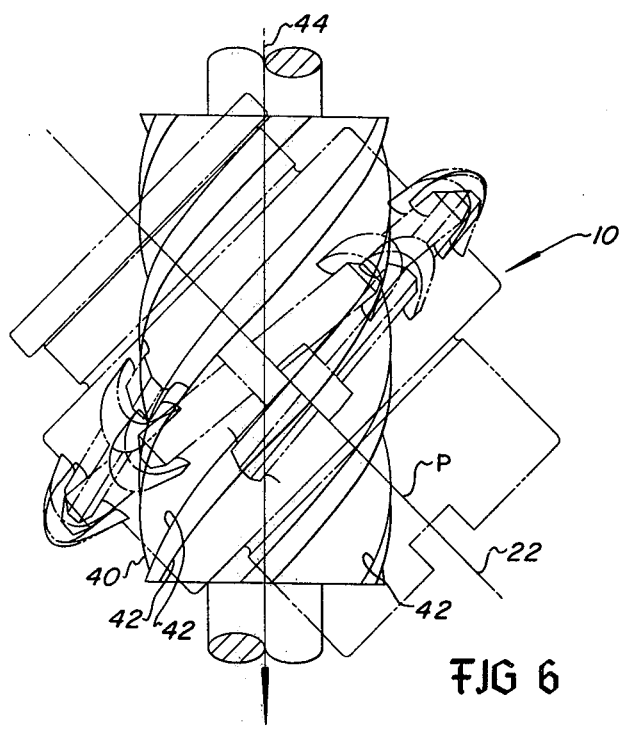
FIG. 6 is a plan view showing the relationship of the profile cutter of the present invention to a workpiece comprising a fluted rotor.
Figure 7:
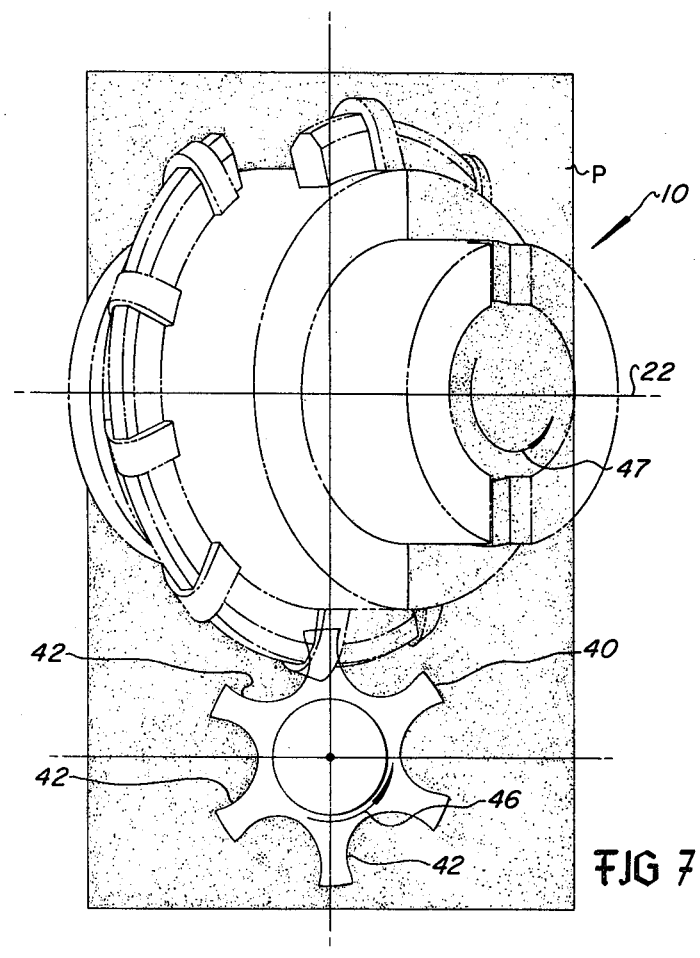
FIG. 7 is an axial end elevation of the cutter and workpiece shown in FIG. 6.

FIGS. 6 and 7 illustrate the relationship of the cutter with respect to the workpiece during the process of forming flutes or grooves thereon. In FIG. 6 the cutter 10 is illustrated in a typical position during the process of cutting a rotor 40 which has six helical flutes or grooves 42. During the cutting process the rotor 40 is mounted for relative movement with respect to the cutter 10 parallel to the axis 44, at a predetermined rate, and in the direction of the arrow on the axis 44 in FIG. 6. The rotor 40 is also rotated about the axis 44 at a predetermined rate in the direction of the arrow 46. The cutter 10 rotates about its axis 22 at a predetermined rate in relation to the rotation of the rotor and in the direction of the arrow 47 in FIG. 7. The ratio of the rate of rotation of the cutter 10 with respect to the rate of rotation of the rotor 40 may be determined from the following expression:

$$R_a = R_i (F/Lr + 1)$$

where:

$R_a$ = The ratio of the rational speed of the cutter 10 with respect to the rotational speed of the rotor 40 required to develop a given helix angle of the rotor flutes.

$R_i$ = The ratio of the number of flutes with respect to the number of cutter starts. The cutter 10 has one start.

F = The axial feed or advance of the cutter relative to the rotor along the axis 44 per revolution of the rotor.

Lr = The helical lead of the rotor flutes measured along the axis 44.

For helically fluted rotors the helix of the flutes will be determined by the ratio, $R_a$, and the feed rate, F. The lead of the rotor, Lr, is determined by rotor design. Moreover, since the helix angle of the flutes measured at the rotor pitch diameter is a function of the pitch diameter and the rotor lead and the cutter will generate a profile form at the pitch diameter then, in effect, substituting a value of rotor lead and a value of the feed F in the above recited equation will give a value to the speed ratio $R_2$ which will produce flutes having the desired helix.

The feed F may be preselected on the basis of a selected cutter rotative speed, number of blades in the cutter, and known ranges of acceptable cutting forces which can be sustained by the cutting blades to produce a smooth surface on the workpiece with acceptable blade life.

The cutter 10 is formed to have a helical lead which corresponds substantially to the spacing between adjacent flutes 42 as measured in a vertical plane through the axis 22, FIG. 6. The cutter 10 is also normally set up with respect to the workpiece or rotor 40 such that the rotation axis 22 is perpendicular to the helix of the flutes 42. Although this angular setting of the cutter is not necessary, it does provide for a more desirable width of the cutter blades 24. A suitable machine for providing the proper mounting and cutting operations for the cutter 10 when cutting helically fluted rotors is a Model 630 high-speed hobbing machine manufactured by Hermann Pfauter, Ludwigsburg, Germany.

Figure 5:
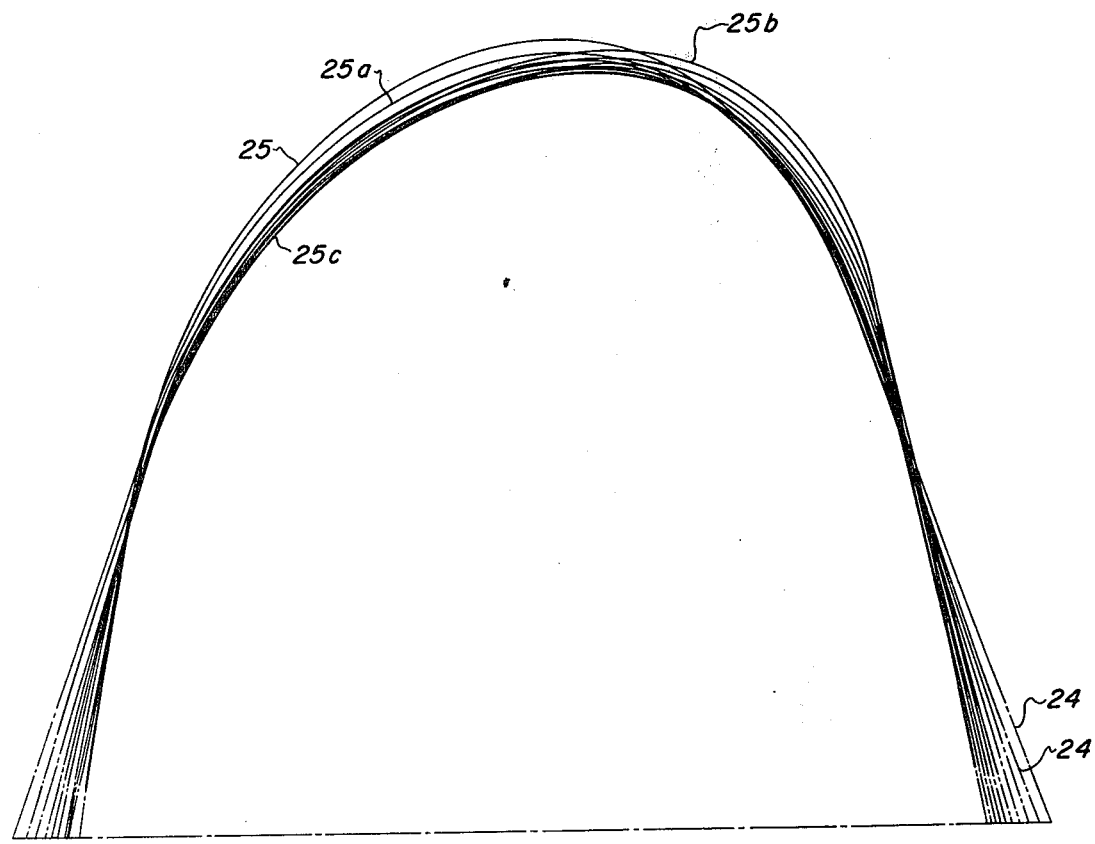
FIG. 5 is a view showing the cutting edge contour of a plurality of cutting blades superimposed on each other.

In accordance with the present invention, it is possible to provide cutters with blades having cutting edge contours which will generate the entire profile of each rotor flute in one pass of the cutter axially along the rotor axis. Thus the workpiece, the rotor 40, may be machined to form in one pass of the cutter. Depending on whether or not the rotor has profiles rough cast to form or the rotor is machined out of solid stock the cutter may be able to finish machine the profiles in one operation. The cutting edge contours of the cutter blades 24 are not identical to the profile of the flutes of the rotor 40 either as viewed in a plane perpendicular to the axis 44 or in a vertical plane, FIG. 6, through and parallel to the axis 22. Moreover, since the rotation of the workpiece is quite rapid and the cutter blades are located along a helix themselves, the contour of each cutter blade 24 will be unlike the contour of every other cutter blade if all blades cut all points on the rotor profile. This is illustrated in FIG. 5 which shows the cutting edge contours for a ten-blade cutter for cutting the flutes of a rotor for a helical screw gas compressor. For the sake of brevity, only the respective cutter contours 25, 25a, and 25b are identified. The ten profiles are superimposed on each other to illustrate the difference in contour. A cutter in accordance with the present invention may be provided with blades which all have the same contour, such a contour being the inner envelope 25c of all of the profiles shown in FIG. 5. With such a cutter the profiles of the flutes would be generated by the cutter, that is each blade might cut only a portion of the flute profile as the blade passes through the workpiece envelope. Such an arrangement might result in uneven wear on the respective blades but would simplify the contour cutter grinding procedure. However, thanks to the arrangement of one row of replaceable blades on the cutter 10, replacement and resharpening of individual blades is easily accomplished.

Referring further to FIGS. 6 and 7, the cutting edge contours of the cutter blades, as viewed in the vertical plane P through the axis 22, may be determined by making a plot of the positions of a sufficiently representative number of points on the rotor flute profile so that a curve may be drawn defining the cutter blade contour which in one or another angular rotative position of the blade all points of the flute profile will be cut and no points on the flute profile will be undercut. In other words, as a cutter blade sweeps through the cylindrical envelope defined by the maximum diameter of the rotor every point on the rotor flute profile, actually the sum of a great number of exceedingly small portions of the flute, will be cut at some angular position or another of the blade as it traverses the rotor envelope. Accordingly, the various positions of a flute profile point must be determined for the time that a blade sweeps through the rotor envelope. For convenience, the position of a point on the rotor flute profile may be located with respect to the rotational axis of the cutter.

Figure 8:
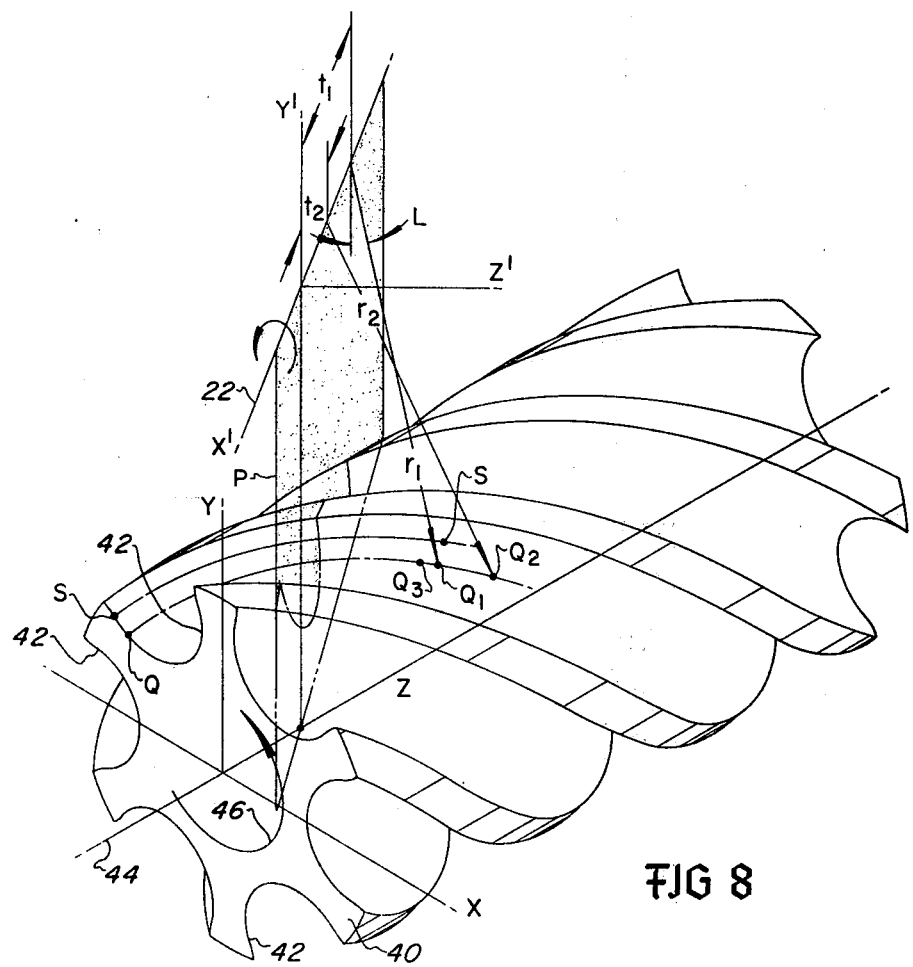
FIG. 8 is a diagram showing the measurement of the position of a flute profile point with respect to the cutter axis; and, FIG. 9 is a graphical plot of a family of curves representing certain positions of various points on the profile of a flute on a workpiece.

Referring to FIG. 8, the various positions of a profile point on the workpiece may be expressed in terms of coordinates r and t where r is the distance along a radial line from the axis 22 to a profile point Q at a particular position on the flute, and t is the position of the point along the axis 22 with respect to a basic reference point on the axis. In FIG. 8 two positions of the point Q in the vicinity of the cutter are represented as $Q_1$ and $Q_2$. The basic reference point at which t corresponds to zero may arbitrarily be selected to be the radially innermost point on the flute profile with respect to the axis 44 which is cut by a blade about midway between the ends of the rotor helix line.

For determining the various values of r and t for a multibladed cutter such as the cutter 10, it may be assumed that the cutter is positioned with respect to the workpiece such that a blade at or near the midpoint of the cutter helix line 20 will cut the radially innermost point on the flute profile when the blade is in the vertical plane P. Accordingly, the contour of each blade on the cutter may be determined by plotting the various positions of a number of points on the flute profile with respect to the cutter axis 22 which point positions may be reasonably assumed to be in proximity to a cutter blade as it passes into and out of the envelope of the workpiece. Unlike conventional form milling processes where it is assumed for practical purposes that the workpiece is substantially nonrotating as a cutter blade passes through the cylindrical envelope of the workpiece the present invention contemplates that a definite relationship between the cutter blade rotative angular position and the rotational angular position of the workpiece must be considered. Moreover, the axial position of each blade along the cutter helix line 20 must be taken into consideration in determining the cutter blade form.

Figure 9:
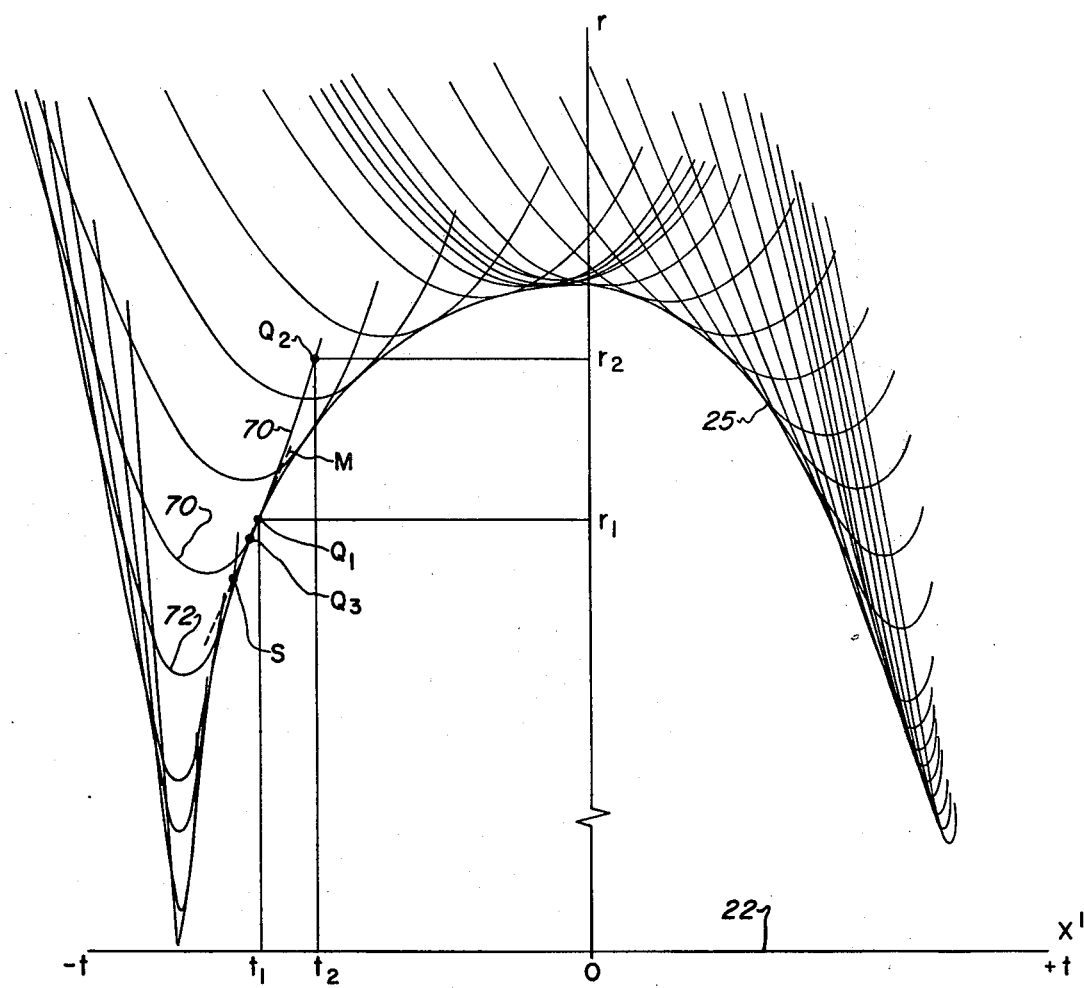

The rotational angular positions of various cutter blades with respect to the rotation of the workpiece is known from the equation for $R_a$ recited hereinabove. Therefore, the position of a point on the flute profile with respect to the axis of rotation of the cutter may be determined in terms of values of r and t. Moreover, a curve of r and t values may be developed for all positions of a particular flute profile point along the flute. Furthermore, a sufficient number of curves plotted for the respective r and t values of a respective number of profile points will produce a family of curves such as shown in FIG. 9 and the inner envelope of this family of curves will define the cutting edge contour of a particular cutter blade. Of course, a sufficient number of curves of r and t values must be chosen such that a smooth envelope is developed and an accurate cutter blade contour is obtained. In a multibladed cutter the blade contour may be determined on the basis that each blade will cut all points on the profile and since rotation of the workpiece is taken into consideration as well as the relative axial positions of each blade along the cutter helix line the cutting edge contour for each blade will be different from that of any other blade. It is possible to provide each blade in a multibladed cutter with the same cutting edge contour and this contour is the inner envelope of the profiles of all of the blades superimposed on each other as shown in FIG. 5.

A cutter may be provided having only one blade but practical limitations on blade rotational speed and axial feed rate would not make such a cutter desirable for production of most types of workpieces. The number of cutter blades may be a matter of design choice and in practicing the present invention a ten-bladed cutter has been developed which is suitable for cutting helically fluted rotors of steel or cast iron and having from four to six flutes.

Helical screw rotor profiles as well as gear profiles may be defined in terms of a three-axis coordinate system having two mutually perpendicular axes in a plane perpendicular to the rotor longitudinal axis of rotation, said last mentioned axis being the third axis of the coordinate system also. Referring to FIG. 8 the coordinates x, y, and z of a point Q on the rotor profile may be defined in terms of coordinates with reference to a plane such as the plane P by appropriate translation and rotation formulas. A set of coordinate points with reference to the plane P, defined as the cutter blade coordinate system, may be developed which will define the cutting edge contour in terms of rotor flute profile points which have been appropriately translated and rotated. By selecting values of cutter blade rotational position and rotor profile point position which are in the vicinity of coinciding with a value of r and t which is on the cutter blade contour, an iteration process may be performed to find a profile point on the cutter blade contour which is more accurately defined than cutter blade contours obtained from graphically constructing the r and t curves.

Referring to FIGS. 8 and 9, a point on the flute profile may be defined in terms of coordinates x, y, and z with respect to the end plane perpendicular to the rotor axis of rotation 44. These coordinates may be appropriately translated and rotated into a coordinate system with reference to the plane P and defined as x', y', and z'. The value of x' is equivalent to the value of t and the value of r is equal to the square root of the sum of y' squared plus z' squared. The below described procedure may be used to determine a series of points on the cutter blade which will define the cutter blade contour.

A procedure may be followed which generally comprises selecting an angular position of the cutter blade with respect to the plane P and a position of a rotor flute profile point Q, position $Q_1$, for example. The corresponding radial line r, for the position of the profile point selected, is computed and by an iterative process the position of point Q is varied until the computed value of r forms the angle L with the plane P, the angle L being equal to the cutter blade angular position which was preselected. When a position of a point on the rotor flute profile is determined which is of such a value that it lies in a plane at the same angle with respect to the plane P as the angular position selected for the cutter blade, a new angular position of the cutter blade is selected which is a small angular increment from the first position and a new position of a profile point is selected, position $Q_3$, for example. If the angular position of a newly computed value for r does not coincide with the newly selected cutter blade angular position, again by iteration, the rotor flute profile point position is varied until the angular position of the resultant value of r coincides with the newly selected cutter blade angle.

The next step in the procedure comprises selection of a new point S on the rotor flute profile close to the previous selected point and selection of the same angular position of the cutter blade as selected for the first point. The relative positions of the points $Q_1$, $Q_3$ and S are somewhat exaggerated in the drawing figures for the sake of clarity. The position of the point S is then varied until the angular position of the corresponding value of r coincides with the selected value of angular position of the cutter blade. Referring to FIG. 9, the positions $Q_1$ and $Q_3$ of points Q are on the r-t curve 70 and the point S is on an r-t curve 72. The slope of a line between the points $Q_1$ and $Q_3$ may be calculated and compared to the slope of a line between point $Q_1$ and the point S. If the slopes are not equal, a new angular position of the cutter blade must be selected and the procedure repeated from the beginning. If the slopes are equal, hence the line M in FIG. 9, a point $Q_1$ on the cutter blade contour and corresponding to a flute profile point has been determined.

The above procedure may be repeated for a sufficient number of points to form a smooth curve which is the cutter blade contour and, of course, the procedure is duplicated for each blade of the cutter giving consideration to blade position on the cutter helix line as well as the rotation of the rotor.

What is claimed is:

1. A method for forming an article to have a plurality of helical flutes or grooves disposed spaced apart about the circumference of said article, said flutes having a common profile measured in a plane perpendicular to a longitudinal central axis of rotation of said article, said method including:

providing a rotary cutter having a cutter body adapted to be rotated about a cutter axis, said cutter including a plurality of cutting blades spaced apart along a helical line with respect to said cutter axis and forming only one turn of the helix;

providing each blade with a cutting edge the contour of which is different from the contour of every other cutting edge and is characterized by a series of points each of which at a particular angular position of said blade with respect to the axis of rotation of said cutter corresponds to the position of a point on the profile of said flutes with respect to the axis of rotation of said cutter whereby all points comprising the profile of said flutes will be cut by each blade of said cutter; and, advancing said cutter with respect to said article in a direction parallel to said central axis of said article while rotating said article and said cutter in such timed relationship, one to the other, that all flutes on said article are formed in one pass of said cutter along said central axis of said article.

2. The method set forth in claim 1 wherein:

said cutter is positioned with respect to said article such that said cutter axis is substantially perpendicular to the helix of said flutes.

3. A method for forming an article to have a plurality of helical flutes or grooves disposed spaced apart about the circumference of said article, said flutes having a common profile measured in a plane perpendicular to a longitudinal central axis of rotation of said article, said method including:

providing a rotary cutter having a cutter body adapted to be rotated about a cutter axis, said cutter including a plurality of cutting blades spaced apart along a helical line with respect to said cutter axis and forming only one turn of the helix;

providing each blade with a planar cutting edge of a common contour, which contour is defined by a series of points which form the inner envelope of a plurality of different planar contours equal to the number of blades in said cutter, said different contours each being characterized by a series of points each of which at a particular angular position of the plane of the respective contour with respect to the axis of rotation of said cutter corresponds to the position of a point on the profile of said flute with respect to the axis of rotation of said cutter; and, advancing said cutter with respect to said article in a direction parallel to said central axis of said article while rotating said article and said cutter in such timed relationship, one to the other, that all flutes on said article are formed in one pass of said cutter along said central axis of said article.

4. The method set forth in claim 3 wherein:

said cutter is positioned with respect to said article such that said cutter axis is substantially perpendicular to the helix of said flutes.

* * * * *